United States Patent Office 3,654,105
Patented Apr. 4, 1972

3,654,105
PRODUCTION OF SILICA SOLS BY ELECTROLYSIS
Henry Thomas Joseph Chilton, Llangollen, Wales, assignor to Monsanto Chemicals Limited, London, England
No Drawing. Continuation-in-part of application Ser. No. 665,733, Sept. 6, 1967, which is a continuation-in-part of application Ser. No. 631,897, Apr. 19, 1967. This application July 15, 1969, Ser. No. 842,031
Claims priority, application Great Britain, July 19, 1968, 34,520/68
Int. Cl. B01j *13/00;* B01k *1/00;* C01b *33/14*
U.S. Cl. 204—101          10 Claims

ABSTRACT OF THE DISCLOSURE

The present invention relates to the production of a silica sol which comprises the steps of passing an electric current between the pair of electrodes, the anode of which pair is fabricated of a silicon-containing material such as a ferrosilicon, positioned in an electrolytic cell containing a liquid medium comprising water, an alcohol such as ethanol and an electrolyte such as sulphuric acid for a sufficient period of time to form the above-described silica sol. Additional embodiments (of the present invention) cover the aqueous medium composition per se and the continuous process for preparing the silica sol.

---

The subject matter of the present invention was disclosed in part in my copending U.S. patent application for Letters Patent Ser. No. 665,733 filed Sept. 6, 1967, now abandoned which in turn is a continuation-in-part of my copending application Ser. No. 631,897 filed Apr. 19, 1967, now abandoned. The disclosure of the present application should be considered in conjunction with the disclosure and claims of the aforementioned patent applications, Ser. Nos. 665,733, now abandoned, and 631,897, now abandoned, and should be considered as a continuation-in-part of Ser. No. 665,733, now abandoned, which is a continuation-in-part of Ser. No. 631,897, now abandoned.

This invention relates to a process for the production of silica sols, and to novel colloidal dispersions of silica that can be obtained by the process.

Various methods for the production of silica sols wherein the colloidal oxide is dispersed in an aqueous or non-aqueous liquid medium have been proposed hitherto, and a variety of applications for the sols so obtained are known, for example, as binding agents in the production of refractory moulds for metal casting. The sols that are obtained by the novel method of the present invention are, in fact, particularly suitable for this latter use. The gels are useful as fillers or thickeners in a variety of compositions.

The process of the invention is one for the production of a silica sol, in which an electric current is passed through a liquid medium comprising water and a monohydric alcohol having from one to three carbon atoms in the molecule, and containing sulfuric acid or hydrochloric acid as a supporting electrolyte, using an anode comprising silicon in contact with the liquid medium. Preferably, the amount of water present in the liquid medium does not exceed 5% by weight of the alcohol.

The reaction by which the silica is formed is believed to be essentially an anodic oxidation of the silicon, the conditions of formation being such that colloidal particles of the silica become dispersed in the liquid medium. The gels of the invention are formed by gelation of the sols.

The novel colloidal dispersions of silica provided by the present invention contain from 1 to 30% by weight of the total composition of silica in a dispersion medium comprising a monohydric alcohol having from 1 to 3 carbon atoms per molecule, up to 10% by weight of the alcohol of water and from 0.1% to 10% by weight of the total composition of hydrochloric acid (expressed as 100% HCl) or from 0.1% to 15% by weight of the total composition of sulphuric acid (expressed as 100% $H_2SO_4$).

The novel colloidal dispersions provided by another embodiment of the present invention contain at least 1% by weight up to 50% or more by weight, preferably from 30% by weight to 50% by weight of silica in a dispersion medium comprising a monohydric alcohol having from 1 to 3 carbon atoms per molecule, up to 10% by weight of the alcohol of water and from 0.005 to 0.15 gram equivalent of acid per liter of sol.

The novel colloidal dispersions provided by still another embodiment of the present invention contain 1 to 30% by weight of silica in a dispersion medium comprising a monohydric alcohol having from 1 to 3 carbon atoms per molecule, up to 10% by weight of the alcohol of water and which are neutral.

The alcohols useful in the present invention process include methanol, ethanol, propanol and isopropanol and mixtures of these alcohols. The electrolysis proceeds most readily where the alcohol is methanol, but the sols produced tend to be somewhat less stable than those obtained using ethanol. Sol formation occurs less readily in propanol and isopropanol than in ethanol, so that ethanol is the alcohol that is generally most satisfactory.

As indicated above, the preferred upper limit to the amount of water present in the liquid medium is 5% of the weight of the alcohol, but in some instances, more than this, for example up to 10% by weight of the alcohol, can be present. As regards a lower limit, some difficulties may be encountered if the amount of water is less than 0.1% of the weight of the alcohol. The preferred range of concentrations is from 0.25 to 5%, with from 0.5 to 2.5%, and more especially from 0.5 to 1% of the weight of the alcohol as more preferred sub-ranges. In determining the optimum proportion in any instance it should be borne in mind that water is consumed during the anodic oxidation, so that to maintain its concentration within a given range, it may be necessary to add water during the course of the electrolysis.

A further feature of the invention is that any sol containing more than 0.5% of water based on the weight of the alcohol is subjected to dehydration or partial dehydration to reduce the water content to not more than this figure. It has been found that the lower the water content, the more stable is the sol. Sols containing, for example, from 0.1 to 0.3% by weight of the alcohol of water can be prepared; the lower limit to the water content is, in practice, set by the hygroscopic nature of the alcoholic medium. Dehydration is conveniently effected by contacting the final sol, the initial acid sol formed by electrolysis or an intermediate sol with a suitable molecular sieve, or by azeotropy during concentration of the sol.

The dispersion medium can contain alcohol-miscible solvents other than water, but for most applications, preferably at least 80% and more preferably at least 90% of the total weight of the dispersion medium is an alcohol having from 1 to 3 carbon atoms per molecule or a mixture of such alcohols. For some applications, however, dispersion media containing significant amounts of higher-boiling alcohol-miscible solvents are preferred. Such solvents may be, for example, higher alcohols such as 2-ethylhexanol, hexanol or pentanol, glycols such as ethylene glycol or propylene glycol, or glycol ethers, such as ethylene glycol monoethyl ether or diethylene glycol monoethyl ether. Sols containing these solvents are preferably prepared by gradual addition of the solvent to a sol from which the alcohol containing 1 to 3 carbon atoms per molecule is being evaporated.

Of the two acids that can be used as the electrolyte of the invention, sulphuric is generally the more convenient to use because of its low volatility and is also preferred because it gives a higher current yield of silica. The electrolyte is essentially only a current carrier, and the amount employed is therefore usually the minimum required to give a practical conductivity. This minimum obviously depends on a number of factors but may typically be about 0.1% by weight of the liquid medium. It is preferable that the concentration of the electrolyte in the liquid medium should not exceed 5% by weight. As will be noted hereinafter in the examples, other electrolytes such as phosphoric, boric, acetic, hydrobromic, hydriodic, and trichloracetic acids were found to be inoperative when used in the present invention process to yield the desired end results, i.e. the silica sol. Furthermore, electrolytes such as caustic soda, caustic potash and the sodium salts of dodecyl benzene sulphonic acid and benzene meta-disulphonic acid were also found to be inoperative.

The anode employed may consist of substantially pure silicon, and various semi-conductor grades of the material, i.e. silicon in which essentially the only impurity is a substance added in controlled amount to impart conductivity of a determined type and magnitude, can be used successfully. It is, however, impractical to use silicon having a resistivity significantly more than 10 ohm-cm. in the present process; silicons having resistivities in the range 0.005 to 1.0 ohm-cm. are generally the most satisfactory. At a given resistivity, n-type semiconductor silicon, that is to say silicon containing an electron-donating impurity, for example phosphorus or antimony, gives better results than p-type semiconductor silicon containing an electron-with-drawing impurity, such as boron of the same resistivity; this is an effect which is more pronounced as the practical resistivity limit of 10 ohm-cm. is approached and is of little consequence in the range of lower resistivities specified above.

For economic reasons, the anode employed in the process of the present invention is usually fabricated from a compound or alloy of silicon rather than from a semiconductor grade of the element. It is desirable that the anode contain at least 25% by weight silicon, preferably from about 50% to about 99%. Ferrosilicons have been found to be especially suitable. The silicon content of the ferrosilicon can, for example, be within the range 60 to 99% by weight, and in typical instances may be within the ranges 70–80%, 90–95% or 97–99% by weight.

Any inert conductive material such as copper, mercury, zinc, and lead can serve as the cathode. Graphite is also a useful cathodic material having a considerable advantage in terms of cost over other functionally suitable materials such as silver.

The electric current used in the process of the invention can be a simple direct current or rectified A.C. with or without smoothing. It has been observed in the experimentation of the present invention that D.C. voltage derived by the rectification of A.C. tends to show peaks corresponding to the maxima of the original sinusoidal A.C. voltage. By the utilization of a suitable "smoothing" circuit between the rectifier and the electrodes, the peaks can be minimised or eliminated and thus, the D.C. voltage applied to the electrodes is "smooth," i.e. steady.

The current density at the anode may typically be within the range of from about 1 to about 100, preferably from about 5 to about 40, amps per square decimetre. A range of 10 to 20 amps per square decimetre is quite suitable; operation at current densities over a wider range than 1 to 100 amps per square decimetre is possible.

The length of time that the current is passed through the electrodes is variable and depends upon the silica concentration desired in the final product sol. For example, the time can range between from about 5 minutes to about 100 hours or more. It is also within the scope of the present invention that the electrolytic process can be conducted in a continuous basis whereby fresh quantities of the aqueous medium containing the electrolyte are continuously fed into the cell containing the anode at a point distant therefrom and concurrently withdrawing the freshly prepared sol which is immediately adjacent said anode.

Operating voltages not more than 70 in excess of the decomposition voltage are preferred because at higher voltages there is a tendency (which increases with the voltage) for the oxide produced by oxidation of the anode to form a coherent layer on the anode surface instead of dispersing as colloidal particles in the liquid medium. Formation of a coherent layer of oxide is accompanied by a rapid increase in the resistance of the cell. For economic reasons, the excess voltage over the decomposition voltage should, in fact, be kept as low as possible. In practice, the operating voltage is determined by factors such as cell design and electrolyte concentration, and wide variations are possible. In our experience, good results have been obtained using voltages ranging from about 10 to 50 volts in excess of the decomposition voltage of the system. Where an unsmoothed or partially smoothed rectified A.C. is employed, the root mean square voltage is considered in determining the preferred operating voltages as discussed above.

It is to be understood that the decomposition voltage is the smallest voltage of the external current source at which permanent current starts to flow and uninterrupted electrolysis begins. In the experiments conducted with regard to the present invention, this decomposition voltage was found to fall generally within a range of from about 2 volts to about 8 volts depending upon the composition of the aforementioned aqueous medium employed in the electrolytic cell.

The electrolysis can be conducted at a range of temperatures, for example, from about 0° C. to about 150° C. or greater. The generally most convenient manner of operating is to provide the electrolysis cell with a reflux condenser and to carry out the process at the boiling point of the liquid medium. The process can be conducted at lower temperatures, however, for example from 10° C. up to the boiling point of the liquid medium, but it is then generally necessary to provide cooling means. Some boiling points of several of the preferred electrolytes, i.e. the aqueous medium containing the acid and alcohol, are (a) 66° C. for methanol-based electrolytes; (b) 78° C. for ethanol-based electrolytes; (c) 81° C. for isopropanol-based electrolytes; and (d) 97° C. for n-propanol-based electrolytes.

In conjunction with the novel processes described herein, it was found during tests (examples), hereinafter described, that hydrogen gas is generally evolved during the electrolysis and consequently, it is desirable to use an inert gas such as nitrogen as a "blanket" in the cell.

Finally, the processes of the present invention proceed in such a manner that the current efficiencies thereof make these processes quite economically attractive on a commercial basis. For example, it was found that when sulfuric acid was used in the aqueous medium, the electrolysis produced from about 0.5 to about 0.6 gram of silica per amp per hour. By the same token, when hydrochloric acid was used, approximately from about 0.2 to about 0.3 gram of silica was produced per amp per hour.

As one embodiment of the present invention, there is provided the additional step to the aforementioned process and which step includes a preliminary period of "anode activation" during which an electric current is passed through the cell with the electrode that is to serve as the anode in the process of the invention as the cathode.

In another preferred embodiment of the present invention, there is provided a continuous process for preparing a silica sol containing from 1% to 50% $SiO_2$ or more, which comprises the steps of continuously introducing an aqueous medium, maintained at a temperature in the range of from about 0° C. to about 150° C. and comprising (a) water, (b) a monohydric alcohol having from 1 to 3 carbon atoms in the molecule, (c) a supporting electrolyte selected from the group consisting of hydrochloric acid or sulphuric acid, into a bi-polar electrolysis cell containing at least one pair of electrodes. The hydrochloric acid, expressed as 100% HCl, is present, when used, in an amount of from about 0.1% to about 10% by weight, based on the total weight of said medium and said sulphuric acid, expressed as 100% $H_2SO_4$, is present, when used, in an amount of from about 0.1% to about 15% by weight based on the total weight of said medium. The aforedescribed aqueous medium is continuously contacted with said electrodes and there is continuously passed through said medium a direct electric current having a density of from about 1 to about 100 amps per square decimetre of electrode surface at a total potential of from about 10 to about 50 volts, above the decomposition voltage of the aqueous medium, between the electrodes. The anode of the aforementioned electrodes is made of a ferrosilicon which has a silicon content of 50% to 99% by weight. As the electrolysis continuously takes place, there is continuously formed in said medium the aforesaid silica sol. Such aquasol so formed is then continuously removed from the cell in a volume and at a rate substantially the same as the rate at which the said aqueous medium is charged to said cell. The point of removal is substantially nearer the anode than the point of introduction of the aforesaid aqueous medium.

It is to be understood that it is also within the scope of the present invention that the electrolysis can, if desired, be conducted in a cell having separate anode and cathode compartments and where this is so, the catholyte may have a different composition from the liquid medium in the anode compartment. For example, the electrolytic cell may have contained therein a pair of electrodes which are separated by a physical membrane such as a ceramic material and which is characterized by allowing ions to pass therethrough but restricting the circulation of liquids from one compartment to the other. In such a case, the anode compartment may have a liquid medium which is completely different from that liquid medium contained in the cathode compartment.

Sols having a range of silica concentrations for example from 1% to 15% by weight of the sol, can be produced by first intention by the process of the invention depending on the amount of anode consumed in relation to the quantity of the liquid medium and these may be further concentrated to sols containing up to 30% by weight or more of silica by evaporation of the solvent, or further treated (by a procedure hereinafter set forth) to give stable sols containing up to 50% or more of silica.

The sols show an increasing tendency to gel on storage under normal atmospheric conditions as the concentrations of silica and of acid increase. For a given acid concentration, there is a minimum silica concentration below which the sol may remain stable almost indefinitely, and vice versa.

The novel colloidal dispersions of silica that are of value in practice are those containing from 4 to 30% by weight of silica and not more than 5% by weight of hydrochloric acid or sulphuric acid. Within these broad limits, compositions containing for example from 5 to 15% or from 10 to 25% by weight of silica and from 0.2 to 1.0% by weight of hydrochloric acid or from 3 to 5% by weight of sulphuric acid are especially useful in certain instances. In accordance with what is said above, the usual form of dispersion where both silica and acid concentrations approach the upper limits is a gel, whereas compositions where both concentrations are relatively low are stable sols. Clearly a wide range of sols having intermediate stabilities is possible.

In respect of water content, the colloidal dispersions of the invention preferably contain from 0.25 to 5% by weight of the alcohol of water.

The invention is illustrated by the following examples.

EXAMPLE 1

8 cc. of 95% by weight sulphuric acid, $H_2SO_4$, were added to 500 cc. of industrial ethanol containing 0.4% by weight of water giving a solution containing 0.6% by weight of water. This solution was placed in a multi-necked flask fitted with a graphite electrode, a ferrosilicon (98% Si) electrode, a water-cooled reflux condenser and a gas inlet tube.

Electrical connections were made such that the graphite electrode was the anode and the ferrosilicon electrode was the cathode, and a current of 2.0 amps was passed for 10 minutes. The polarities of the electrodes were then reversed, and the electrolysis was continued for 15 hours at a current of 2.0 amps and an equilibrium potential of 34–50 volts. During this period nitrogen was passed into the space above the liquid. The heat generated was sufficient to cause refluxing of the solvent.

The product was a clear pale yellow silica sol which weighed 404.8 grams and contained 16.2 grams (4% by weight) of silica. The total consumption of electricity during the process was 29.6 ampere hours corresponding to a yield of 0.55 gram of silica per ampere hour.

The decomposition voltage of the system was 4±1 volts at reflux.

In order to demonstrate the criticality of using HCl or $H_2SO_4$ as the electrolyte, Example 1 was repeated several times. Each time such repeat was undertaken, either phosphoric acid, boric acid, acetic acid, hydrobromic acid, hydriodic acid, trichloracetic acid, caustic soda, caustic potash, the sodium salt of dodecyl benzene sulphonic acid or the sodium salt of benzene meta-disulphonic acid was substituted for the sulphuric acid. The end product in each case was not a silica sol; in fact, there was very little change. It was determined in each case that the aqueous medium containing the aforementioned electrolytes (e.g. boric acid etc.) was substantially non-conductive. Furthermore, it was observed and analyzed that where there was a minute current flow, the only effect thereof was the oxidation of the alcohol in said aqueous medium. Consequently, it can readily be seen that all electrolytes are not equivalent in their function or utility when viewed in light of the novel processes described herein.

EXAMPLE 2

This example describes the production of a silica-in-methanol sol.

A solution of 2.0 cc. of 95% by weight sulphuric acid in 500 cc. of analytical reagent grade methanol was placed in the apparatus described in Example 1. A potential difference of 20 volts was applied, with the graphite electrode positive and the ferrosilicon electrode negative, and the solution was heated to boiling point.

The initial current of 0.05 amp rose to 2.0 amps during the period of 68 minutes for which the electrolysis was continued in this manner, further additions of 95% w./w. sulphuric acid (one of 2.0 cc. after 5 minutes, and one of 0.5 cc. after 61 minutes) having been made during this time.

The polarities of the electrodes were then reversed and the electrolysis was continued for 15 hours at a current of 2.0 amps, 1 hour at 1.6 amps and for a final 37 minutes at 1.2 amps. The equilibrium voltage varied from 20 to 48 volts.

The entire process was conducted in an atmosphere of nitrogen and apart from the initial heating of the solution to its boiling point, resistive heating by the electrical current was sufficient to maintain the solution at this temperature throughout.

The product was a clear pale green silica sol having a weight of 391 grams and containing 17.2 grams (4.4% by weight) of silica. The total electricity consumption during the process was 32.8 ampere hours, corresponding to a yield of 0.52 gram of silica per ampere hour.

EXAMPLE 3

This example describes the production of a silica-in-ethanol sol using hydrochloric acid as the electrolyte.

A solution of 3 cc. of 32% by weight aqueous hydrochloric acid in 500 cc. of industrial ethanol was placed in the apparatus described in Example 1. With the graphite electrode positive and the ferrosilicon electrode negative, an initial current of 0.4 amp was passed at 50 volts potential. After 4 minutes a further 5 cc. of 32% hydrochloric acid were added. Resistive heating caused boiling after 20 minutes and thereafter maintained reflux.

The electrode polarities were then reversed, and a current which varied between 1.18 and 1.75 amps was passed at a potential of 49–78 volts for 14.5 hours. Additions of 0.5 cc. of hydrochloric acid were made at hourly intervals, and the entire process was conducted in an atmosphere of nitrogen.

The product was a pale green silica sol which weighed 395.2 grams and contained 4.74 grams (1.2% by weight) of silica. The total consumption of electricity was 20.3 ampere hours, corresponding to a yield of 0.24 gram of silica per ampere hour.

EXAMPLE 4

This example describes the production of silica-in-ethanol sol using a ferrosilicon electrode containing 70–80% of silicon in contrast to the 90% of silicon in the ferrosilicon electrode employed in the previous examples.

A solution of 8 cc. of 95% by weight sulphuric acid in 500 cc. of industrial ethanol was placed in an apparatus essentially the same as that described in Example 1 but having a different ferrosilicon electrode as explained above. With the graphite electrode positive and the ferrosilicon electrode negative, current was passed for ten minutes at a potential of 30–40 volts. During this time resistive heating boiled the solution and thereafter maintained it at reflux; the current also increased from 0.90–1.70 amps. The electric polarity was reversed and a current of 2.0 amps (with minor fluctuations) was passed for six hours at a potential of 40–82 volts. The process was conducted under a stream of nitrogen.

The product was a clear pale straw-coloured silica sol which weighed 421.5 grams and contained 6.52 grams (1.55% by weight) of silica. The total consumption of electricity in the process was 12.0 ampere hours corresponding to a yield of 0.54 gram per ampere hour

EXAMPLE 5

This example describes the production of a silica in methanol sol using hydrochloric acid as the electrolyte.

Using the apparatus described in Example 1, a potential of 30 volts was applied between a ferrosilicon (98% Si) cathode and a graphite anode in a solution of 3 cc. of 32% by weight aqueous hydrochloric acid in 500 cc. of methanol, giving a current of 0.95 amp. Increasing the potential to 50 volts produced a current of 1.6 amps after 2 minutes, which increased to 2.0 amps after a further 3 minutes. The current was maintained at 2.0 amps for 5 minutes during which time the potential dropped to 43 volts. At this point the graphite electrode was made cathodic and the ferrosilicon electrode anodic. Electrolysis was continued at 2.0 amps and after a further 5 minutes, boiling and refluxing of the electrolyte mixture occurred, due to resistive heating. Electrolysis at 2.0 amps current was continued for 14 hours during which time the potential varied in the range 37–66 volts. From time to time the rise in potential as electrolysis was continued was reversed by the addition of small quantities of hydrochloric acid. Over the 14 hours a total of 9 cc. of acid was added in this way. The product was 356.7 grams of clear green silica sol containing 6.77 grams of silica. The electricity consumed in the reaction was 28 amp hours, corresponding to a current yield of 0.24 gram silica/amp hour.

EXAMPLE 6

This example describes the production of a silica in ethanol sol by essentially the same process as that described in Example 1 but using a ferrosilicon anode having a lower silicon content.

500 cc. of ethanol were placed in the standard apparatus, equipped in this instance with a graphite electrode and a ferrosilicon electrode having a silicon content of approximately 92% by weight, and maintained under a current of nitrogen. 6 cc. of 95% by weight sulphuric acid were added to the ethanol and a current of 0.8 amp was obtained for an applied potential of 30 volts, the electrical connections being such that the graphite electrode was the anode and the ferrosilicon electrode the cathode. A further 2 cc. of 95% by weight sulphuric acid was added and the potential maintained at 30 volts while the current gradually rose to 1.10 amps over 15 minutes as the solution warmed up. At this point the graphite electrode was made cathodic and the ferrosilicon anodic. At 30 volts a current of 1.65 amps was obtained whereupon the potential was increased to 42 volts to give a current of 2.0 amps. The potential was adjusted in the range 42–72 volts over a period of 6 hours 30 minutes to give a constant current of 2.0 amps. During this period a further 4 cc. of acid were added to reduce the potential required to maintain the current. The product was 441 grams of a silica sol containing 1.55% by weight of silica. The current yield was 0.53 gram silica/amp hour.

EXAMPLE 7

8 cc. of 95% by weight sulphuric acid were added to 500 cc. of industrial ethanol in a multi-necked flask fitted with a graphite cathode, a 95% ferrosilicon anode, a reflux condenser, a stirrer and a gas inlet tube. A current of 2 amps was passed for 22.5 hours at a potential of 38–50 volts to give a clear pale green colloidal solution of silica containing 24.1 grams of silica at a concentration of 5.6% by weight. The current yield of the process was 0.54 gram silica/amp hour. Samples of the silica sol were concentrated by distillation on a water bath to give sols containing respectively 11.2%, 15.3% and 20.4% by weight of silica. The 15.2% and 20.4% sols gelled after standing at room temperature for 5 days, and the 11.2% sol gelled after standing at room temperature for 16 days. The gels were soft, transparent materials. The 5.6% sol was still stable after five months.

EXAMPLE 8

8 cc. of 95% by weight sulphuric acid and 500 cc. of industrial ethanol were placed in the apparatus of Example 7 and electrolysed at a current of 2 amps and a potential of 30–40 volts. During the electrolysis the liquid volume was kept constant by additions of ethanol. After 34 hours the voltage required to maintain a current of two amps had risen to 50 volts. Over the next 13 hours a further 5 cc. of 95% by weight sulphuric acid were added and the voltage varied from 48–58 volts. At this point the electrolysis was discontinued as the formation of a faint white precipitate was observed. The faint precipitate settled to leave a blue-green clear silica sol containing 13.0% by weight of silica. The current yield of the reaction was 0.51 gram silica/amp hour as sol. The sol formed a clear soft gel after standing 2 days at room temperature.

EXAMPLE 9

4 cc. of 95% by weight sulphuric acid were added to 500 cc. of methanol in the apparatus of Example 7 and electrolysed with a current of 2 amps at the potential of 17–22 volts for 19 hours 45 minutes. The almost colourless sol produced contained 4.9% by weight of silica. The current efficiency was 0.40 gram silica/amp hour. Samples of the sol were concentrated to 7.4% and 10.2% by weight of silica by distillation. After six days both samples had gelled. The original 4.9% by weight sol was stable for up to 2 months after which partial gelation was observed.

Another facet of the present invention accordingly provides alcoholic silica sols having acid contents within the range associated with maximum stability and a process whereby such sols are produced from the sols that are the products of the electrolytic process of the aforementioned process.

Thus, another part of the present invention is one for the production of an acid-stabilized, alcoholic silica sol, which comprises deacidifying, to give substantially neutral sol (which is to be understood as a sol containing $10^{-6}$ or less gram equivalents of acid per liter of sol) an acidic sol containing from 1 to 15% by weight of silica, obtained by employing the aforementioned process, mixing the substantially neutral sol with acid and if necessary concentrating the sol to give a silica concentration of at least 5% by weight, the amount of acid mixed with the substantially neutral sol being such that the final acid-stabilized sol contains from 0.005 to 0.15 gram equivalents of acid per liter of sol.

Preferably, the amount of acid mixed with the neutral sol is such that the final sol contains from 0.03 to 0.045 gram equivalents of acid per liter of sol, and preferably the liquid medium used in the formation of the original acidic sol contains from 0.5 to 2.5% of the weight of the alcohol of water. The usual alcohols are methanol and ethanol.

Novel sols provided by this facet of the present invention include sols containing at least 5% by weight of silica and from 0.005 to 0.15 gram equivalent, preferably from 0.03 to 0.045 gram equivalent of acid per litre of sol in a dispersion medium comprising a monohydric alcohol having from 1 to 3 carbon atoms per molecule and containing not more than 5% of the weight of the alcohol of water.

A particular class of such sols are those containing over 30% by weight of silica. Sols containing from 30 to 35% by weight of silica are stable for prolonged periods. The stability tends to decrease as the concentration of silica increases, and about 40% by weight of silica appears to be the upper practical limit if the sol is liable to be stored for some time before use. However, sols containing up to for example 50% by weight of silica can be made for use within a short period.

This facet of the present invention also provides silica sols containing from 1 to 30% by weight of silica in a dispersion medium comprising a monohydric alcohol having from 1 to 3 carbon atoms per molecule and which are neutral.

The usual method for the deacidification of a sol that has been produced electrolytically is to contact it with an anion exchange resin in the hydroxyl form. Reacidification of the neutral sol can be effected by the addition of acid as such or for example by mixing the deacidified sol with a further quantity of the original acidic sol.

Where the sole is to be concentrated, it is preferable that the required amount of acid should be mixed with the dilute sol before the process of concentration is begun, but it is possible to effect some degree of concentration of the neutral sol and adjust the acidity subsequently.

The anion exchange resins that can be used include any that are suitable for the deacidification of alcoholic acid solutions. Several such resins are commercially available, for example DEACIDITE FF. A principal class of such materials have a 3-dimensional polymeric network structure with quaternary ammonium hydroxyl as the functional group.

The acids that can be used as supporting electrolytes in the electrolytic production of alcoholic silica sols are sulphuric acid and hydrochloric acid, but a somewhat wider range of acids can be used to provide the required degree of acidity in a sol from which the original acid has been removed. Preferably, the acid is one that is fully dissociated or has a dissociation constant greater than $10^{-2}$ in water at 25° C., and more preferably one that is fully dissociated or has a dissociation constant greater than $10^{-1}$ in water at 25° C. In additional to sulphuric and hydrochloric acids, examples include hydrobromic acid, sulphamic acid, trichloroacetic acid and sulphonic acids, for example benzene-sulphonic acid. Hydrofluoric acid is of course not suitable because it reacts with silica.

During concentration, the temperature of the sol preferably does not exceed 60° C., so that evaporation of the alcohol is generally carried out under reduced pressure. This aspect of the invention is illustrated by the following examples.

EXAMPLE 10

Each of a number of sols prepared by electrolysis using a ferrosilicon anode in a sulphuric acid-containing ethanolic electrolyte according to the process of Example 1, was passed through a column of "Deacidite FF" anion exchange resin. The original sols had sulphuric acid contents of approximately 3.5% by weight, while the effluent sols were substantially acid free as shown by Universal Indicator paper.

A measured amount of 98% by weight sulphuric acid was added to each sol, which was then conventrated by evaporation of the ethanol at a pressure of 70 mm. of mercury corresponding to a boiling point of 35–40° C.

The concentration of silica in the sols before and after concentration and the quantity of acid in the concentrated sol are shown in the table below. The column headed "Stability" gives the number of days for which the sol was stored at room temperature before the onset of gelation. The sols contained about 2% of water based on the weight of the alcohol.

| Percent by weight of silica | | Acidity of concentrated sol | | |
|---|---|---|---|---|
| Dilute sol | Concentrated sol | Millilitres 98% $H_2SO_4$/100 millilitres | Gram-equivalents per litre | Stability |
| 3.63 | 32.2 | 0.2 | 0.075 | 96 |
| 3.87 | 34.2 | 0.4 | 0.150 | 22 |
| 3.75 | 31.8 | 0.1 | 0.038 | 129 |

EXAMPLE 11

Further sols were prepared by a procedure similar to that of Example 1 but with the modification that dilute sol was concentrated by distilling under reduced pressure in a still fitted with a capillary bleed to control the evaporation rate, the gas introduced through the capillary bleed being dry nitrogen. In Example 10, the same type of apparatus was used but atmospheric air was drawn through the capillary. The result of the modification of the present example was that the concentrated sols had a lower water content than those of Example 10, and in consequence, the sols showed increased stabilities even though, as indicated below, the acid concentrations were higher.

Thus 98% $H_2SO_4$ was added to a deacidified sol containing 4.8% by weight of silica in an amount of 0.03 ml. per 100 ml. of sol and the ethanol was evaporated as described above until the silica content had increased to 31.5% by weight and the acid concentration to 0.075 gram equivalent per litre. This sol was stable at room temperature for 290 days. Its water content was approximately 0.2% of the weight of the alcohol.

EXAMPLE 12

98% sulphuric acid was added to a deacidified ethanolic sol containing 4.9% by weight of silica in an amount of 0.04 ml. per 100 ml. of sol, and the ethanol was evaporated by the procedure of Example 11 until the silica content had increased to 25.1% by weight and the acid concentration to 0.075 gram equivalent per litre. This sol was stable at room temperature for 300 days.

EXAMPLE 13

This example describes the preparation of an anhydrous sol and the effect of increasing the water content.

98% sulphuric acid was added to a deacidified ethanolic sol containing 4.8% by weight of silica in an amount of 0.015 ml. per 100 ml. of sol, and the ethanol was evaporated as described in Example 11 to give a sol containing 29% by weight of silica and 0.038 gram equivalent of sulphuric acid per litre. The sol was dried over a molecular sieve and divided into four portions. Three of the portions had varying amounts of water added, and then all samples were sealed into dry tubes and placed in an oven at 55° C. Gelation times at this temperature and the corresponding water contents are shown in the following table:

| Added water | | Gel time (days) |
|---|---|---|
| Percent by volume of sol | Percent by weight of alcohol | |
| 0 | 0 | 36 |
| 0.1 | 0.14 | 30 |
| 0.5 | 0.72 | 14 |
| 2.0 | 2.86 | 4 |

The results show that the stability of the sol is adversely affected by water.

What is claimed is:

1. A process for production of a silica sol containing at least 1% by weight of $SiO_2$ which comprises passing an electric current between at least one pair of electrodes positioned in an electrolytic cell containing a liquid medium consisting essentially of (a) water, said water being present in an amount from about 0.1% to about 10% by weight, based on the total weight of the alcohol, (b) a monohydric alcohol having from 1 to 3 carbon atoms in the molecule, (c) a supporting electrolyte selected from the group consisting of hydrochloric acid and sulfuric acid, for a sufficient period of time to form the aforesaid silica sol; said hydrochloric acid, expressed as 100% hydrochloric acid, being present, when used, in an amount of from about 0.1% to about 10% by weight, based on the total weight of said medium and said sulfuric acid, expressed as 100% sulfuric acid, being present, when used, in an amount of from about 0.1% to about 15% by weight, based on the total weight of said medium; the anode of at least one pair of said electrodes being constructed of a material having a resistivity of not more than 10 ohm-cm. and selected from the group consisting of silicon and silicon-containing alloys containing at least 25% by weight of silicon, said electrodes having up to 70 volts, in excess of the decomposition voltage of said silicon anode, potential therebetween, and said liquid medium being maintained during the entire process at a temperature of from about 10° C. to about the boiling point of such medium.

2. The process as set forth in claim 1 wherein the amount of water in the liquid medium is less than 5% by weight, based on the total weight of said alcohol, said alcohol is selected from the group consisting of methanol and ethanol, the electrolyte in the liquid medium does not exceed 5% by weight, and the anode is a ferrosilicon containing from about 60% to about 99% by weight of silicon.

3. The process as set forth in claim 1 wherein said process is operated under reflux at the boiling point of the liquid medium during the passage of said electric current between at least one pair of electrodes, and including a preliminary period of anode activation during which said electric current is passed through the liquid medium with the electrode that is to serve as the anode in the production of said sol serving as the cathode.

4. The process as set forth in claim 1 wherein (1) the pair of electrodes consist of an anode and cathode which are physically separated from each other by a membrane and thus form a separate anode compartment and a separate cathode compartment within said cell; (2) the aforedescribed liquid medium is substantially contained in said anode compartment; and (3) the cathode compartment contains an ion-conducting liquid which is different in composition from the aforedescribed liquid medium.

5. A process according to claim 1 wherein additionally said sol containing from 1 to 15% by weight of silica is deacidified to a substantially neutral sol, thereafter said substantially neutral sol is mixed with an acid having a dissociation constant greater than $10^{-2}$ in water at 25° C., said composition containing from 0.005 to 0.15 gram equivalent of acid per liter of composition and said composition containing at least 5% by weight, based on the total weight of the composition, of silica.

6. A process according to claim 5 in which the amount of acid mixed with the substantially neutral sol is such that the final composition contains from 0.03 to 0.045 gram equivalent of acid per liter of sol.

7. A process according to claim 5 wherein said acids are selected from the group consisting of sulphuric acid and hydrochloric acid.

8. A process according to claim 7 wherein the amount of acid in the liquid medium is less than 5% by weight based on the total weight of said sol, said alcohol is selected from the group consisting of methanol and ethanol, the electrolyte in the liquid medium does not exceed 5% by weight, and the anode is a ferrosilicon containing from about 60% to about 99% by weight of silicon.

9. A process according to claim 1 wherein said silica sol containing more than 0.5% by weight, based on the weight of the alcohol, of water, additionally is contacted with a molecular sieve to reduce the amount of water to not more than 0.5% by weight based on the weight of the alcohol.

10. A continuous process for preparing a silica sol containing at least 1% $SiO_2$, which comprises the steps of (1) continuously introducing an aqueous medium, maintained at a temperature in the range of from about 0° C. to about 150° C. and consisting essentially of (a) water, said water being present in an amount of from about 0.1% to about 10% by weight based on the total weight of the alcohol, (b) a monohydric alcohol having from 1 to 3 carbon atoms per molecule, (c) a supporting electrolyte selected from the group consisting of hydrochloric acid and sulfuric acid, into a bi-polar electrolysis cell containing at least one pair of electrodes; said hydrochloric acid, expressed as 100% hydrochloric acid, being present, when used, in an amount of from about 0.1% to about 10% by weight, based on the total weight of said medium and said sulfuric acid, expressed as 100% sulfuric acid, being present, when used, in an amount of from about 0.1% to about 15% by weight based on the total weight of said medium; (2) contacting said aqueous medium with said electrodes and continuously passing an electric current having a density of from about 1 to about 100 amps per square decimetre of electrode surface at a total potential of from about 10 to about 50 volts, above the decomposition voltage of the aqueous medium, between the electrodes through said aqueous medium; said anode of the aforementioned electrodes being made of a ferrosilicon which has a silicon content of from about 50% to about 99% by weight; and (3) continuously removing the aforesaid silica sol which is continuously formed in said medium from the cell in a volume and at a rate substantially the same as the rate at which the said aqueous medium is charged to said cell; such point of removal being substantially nearer the anode than the point of introduction of the aforesaid aqueous medium.

References Cited

UNITED STATES PATENTS

| | | | |
|---|---|---|---|
| 2,375,738 | 5/1945 | White | 252—309 |
| 2,386,247 | 10/1945 | Marshall | 252—313 X |
| 2,515,961 | 7/1950 | Marshall | 252—313 |

RICHARD D. LOVERING, Primary Examiner

U.S. Cl. X.R.

106—38.35; 252—309, 313 S, 317